United States Patent [19]

Stebbins et al.

[11] Patent Number: 5,108,674

[45] Date of Patent: Apr. 28, 1992

[54] METAL SULFIDE BODY METHOD

[75] Inventors: Doris N. Stebbins, Corning; Lina M. Escheverria, Painted Post, both of N.Y.

[73] Assignee: Corning Incorporated, Corning, N.Y.

[21] Appl. No.: 495,769

[22] Filed: Mar. 19, 1990

[51] Int. Cl.⁵ .............................................. C04B 35/64
[52] U.S. Cl. ........................................ 264/65; 264/56; 264/62; 501/12
[58] Field of Search ............... 264/56, 65, 62; 501/12; 423/566.1

[56] References Cited

U.S. PATENT DOCUMENTS

| 2,732,313 | 1/1956 | Cusano . | |
| 3,024,381 | 3/1962 | Dalton | 313/112 |
| 3,131,238 | 4/1964 | Carnall | 423/566.1 |
| 4,429,051 | 1/1984 | Davidge | 501/12 |
| 4,541,855 | 9/1985 | Scherer | 264/56 |
| 4,561,872 | 12/1985 | Luong | 501/12 |
| 4,574,063 | 3/1986 | Scherer | 264/60 |
| 4,595,545 | 6/1986 | Sane | 501/12 |

OTHER PUBLICATIONS

Sakka, Gel Method for Making Glass, Treatise on Materials Science and Technology, vol. 22, pp. 129-167.

Primary Examiner—James Derrington
Attorney, Agent, or Firm—Milton M. Peterson; Clinton S. Janes, Jr.

[57] ABSTRACT

A method of employing soot casting technology in the production of sintered, metal sulfide, monolithic bodies, such as zinc sulfide bodies, is disclosed. The method comprises forming a colloidal dispersion from submicron particles of the metal sulfide, gelling the colloidal dispersion, drying and sintering the gel. By sintering in either a sulfidizing or reducing atmosphere, atomic vacancies are created which render the material non-stoichiometric and lead to a dense, sintered body.

20 Claims, No Drawings

METAL SULFIDE BODY METHOD

FIELD OF THE INVENTION

The field of the invention is production of sintered, metal sulfide, monolithic bodies.

BACKGROUND OF THE INVENTION

It is common practice in the coating art to produce metal sulfide films on a surface by vapor deposition. Of particular interest are zinc sulfide films on articles, such as bulbs and lenses, for special radiation transmission effects.

Sulfide vapors may be generated by thermal evaporation, as described in U.S. Pat. No. 3,024,381 (Dalton et al.). They may also be generated by electron beam bombardment, as proposed in U. S. Pat. No. 3,468,594 (Vogl et al.). Still another technique involves chemical reaction of metal vapors with a sulfide gas, such as hydrogen sulfide, to yield the desired metal sulfide. This procedure is described, for example, in U. S. Pat. No. 2,732,313 (Cusano et al.).

It has also been proposed to employ vapor deposition techniques in producing monolithic, metal sulfide bodies. For example, zinc sulfide vapors may be generated and deposited, usually on a glass surface. The "green" body, thus formed, may then be sintered. Current practice is to employ a chemical reaction process wherein separate sources of reactants are volatilized and reacted at relatively high temperatures. The vapors thus formed are deposited onto a substrate maintained at a lower temperature.

Deposition rates in such a procedure are very slow, e.g. 100 micrometers/hour. Thus, the process extends over days, or even weeks, thereby requiring extreme care in temperature control. The resulting body is porous, and must be subjected to high pressure and temperature in order to achieve transparency. As a consequence, the process is feasible only for very costly items, such as certain infrared transmitting lenses.

Extensive literature exists on the production of pure oxide bodies by a technology referred to as "soot casting". In general, this technology involves treatment of fluffy oxide particles, produced by oxidation of precursor compounds, such as chlorides and organometallics. The oxide particles are suspended in a colloidal dispersion, the colloid gelled by a gelling agent, and the gel dried and sintered. The procedure is described, for example, in the following U. S. Pat. Nos.: 4,541,855 (Scherer); No. 4,561,872 (Luong et al.); No. 4,574,063 (Scherer). Insofar as we are aware, this technology has not been explored beyond oxide materials.

PURPOSES OF THE INVENTION

A basic purpose is to provide dense, pure, sintered, metal sulfide, monolithic bodies.

A further purpose is to provide a simpler, less expensive method for producing such bodies than heretofore available.

Another purpose is to apply soot casting technology to the production of such bodies.

A still further purpose is to provide an alternative to the chemical vapor deposition process heretofore used in producing zinc sulfide, monolithic bodies.

PRIOR LITERATURE

Applicants are not aware of literature more relevant to their invention than that already referred to in the background discussion.

SUMMARY OF THE INVENTION

In furtherance of the purposes stated above, as well as others that are apparent, our invention resides in a method of producing a non-stoichiometric, metal sulfide, monolithic body which comprises forming a colloidal dispersion of submicron particles of the metal sulfide, exposing the colloidal dispersion to a gelling agent to form a gel, drying the gel to a porous "green" body, and sintering the "green" body.

In preferred embodiments, the metal sulfide is zinc sulfide, the particles dispersed are 0.1 to 0.3 microns in diameter, the particles are dispersed in an organic, non-polar medium and the loading is up to about 35% solids. The gelling agent may be a source of ammonia, and the "green" body is preferably sintered in either a sulfidizing atmosphere, a reducing atmosphere, or an atmosphere of the metal vapor.

More specifically, a zinc sulfide "green" body may be sintered at temperatures in the range of 900° C.–1000° C. in a hydrogen sulfide or a $H_2/N_2$(forming gas) atmosphere, preferably while packed in either sulfur or zinc powder, respectively.

GENERAL DESCRIPTION OF THE INVENTION

The inventive method has general applicability to any metal sulfide in which non-stoichiometry may be enhanced during sintering. This means the metal sulfide (MS) must be capable of being varied from a fixed M/S ratio. The non-stoichiometric state may be expressed in formula terms as $M_{1-x}S$ or $MS_{1-x}$, depending on the direction of atomic deficiency engendered. As explained later, a key feature of the present invention is enhancement of the non-stoichiometric condition during sintering.

A suitable material for processing may be selected from a wide variety of metal sulfides. These include, for example, the sulfides of zinc (sphalerite and wurtzite), iron (pyrrhotite and mackinawite), copper (covellite), mercury (cinnabar), cobalt (jaipurite), and antimony (metastibnite). Also available are the binary sulfides of cobalt and antimony (stromeyerite), of bismuth and tellurium (tetradymite), copper and antimony (tetrahedrite), and iron and titanium (heideite).

A sulfide of particular interest is zinc sulfide. Accordingly, experimental studies were focused on this material, and the invention is described with respect thereto. However, its adaptability, to the other sulfides indicated, will be readily apparent.

In addition to selecting a non-stoichiometric metal sulfide, two key features of the present inventive method are employing the soot casting technique and controlled atomic vacancy sintering. The former enables relatively simple creation of a porous, "green" body preparatory to sintering. The latter promotes the non-stoichiometry essential to producing a dense, sintered body.

In general, a sulfide having a mean particle size of 0.1 to 0.3 microns is preferred. Zinc sulfide is available from various commercial sources in the desired particle size. The particular material selected for study had a mean particle size of 0.3 microns and a surface area of 8 $m^2$/gram.

The soot casting technique embodies steps of (1) dispersing a material in an organic, non-polar liquid to form a colloid, (2) subjecting the colloid to a gelling agent to form a semi-solid gel, and (3) drying the gel to form a porous, "green" body preparatory to sintering. The material may be vacuum dried, and maintained dry until dispersed to form a colloid.

In preparing a colloid, the selected sulfide, in particulate form, is dispersed in an organic, non-polar medium. Particularly effective media include chloroform ($CHCl_3$), methylene chloride, and acetone. Commercial dispersants are readily available. Among these are one available from Ruger Chemical under the name Renex, a commercial laboratory detergent available under the name Liquinox, and one available under the name OLOA and characterized by a multiple basic group at the end of a polyisobutylene chain.

A solution of dispersant and medium is first prepared in a bottle, or other suitable container. The sulfide soot particles are then added together with TEFLON mill balls. The container is then vigorously agitated for up to eight hours to homogenize the colloid. The presence of agglomerates in the colloid give rise to low density areas and/or pores in the sintered product.

The density of the gel produced from a colloid is a function of the solid content of the colloid. Therefore, it is important to prepare colloids as concentrated as possible without unduly compromising viscosity. Some dispersants are very sensitive to humidity, thus necessitating very dry conditions. Colloids having a solid loading up to about 35% have been prepared from zinc sulfide by using a solution of Renex in methylene chloride, or OLOA in chloroform.

After homogenizing, the colloid may be poured into a mold, or form, having the desired product shape. The colloid is then exposed to a gelling agent, which may be a basic material. Conveniently, this may be by exposure to ammonia vapors. Gelation is normally completed in times not over one hour.

The gelled product is then allowed to air dry for 3 to 5 days. Densities up to 50 to 60% of theoretical can be obtained with colloids having maximum solids loading. The dried product is now ready for sintering.

Homogenous "green" bodies were sintered to full density by embedding the body in elemental sulfur powder, and heating at a sintering temperature of 920° C. for 15-30 minutes in an atmosphere of pure hydrogen sulfide. Similar results were obtained by embedding a zinc sulfide body in elemental zinc powder, and heating at a sintering temperature of 1000° C. for 30 minutes in a forming gas atmosphere.

The very rapid and effective sintering is controlled by increased atomic mobility in an atmosphere that promotes atomic vacancies. Zinc sulfide is a non-stoichiometric compound that may have either zinc or sulfur vacancies in its atomic structure, according to the atmosphere and temperature conditions of formation. Sintering in a highly sulfidizing atmosphere promotes zinc vacancies. These create pathways for the rapid atomic diffusion required for effective sintering. Similarly, sintering in a zinc atmosphere promotes sulfur vacancies, with similar results. Sintering of zinc sulfide in a manner that controls its atomic vacancies then is a key to a dense, sintered product.

SPECIFIC EMBODIMENT

In processing a typical sample, 48 grams of zinc sulfide powder, consisting of spherical particles 0.1 to 0.3 micrometers in diameter, were vacuum fired at 430° C. for 2 hours. Operating inside a glove box attached to the vacuum furnace, the powder was then added to a Teflon bottle, containing a solution of 1 ml heated and filtered Renex and 20 ml methylene chloride, to make a colloid. Teflon mill balls were added, and the colloid put on a shaker for 2-8 hours. Following this mixing, a high shear mixer was used for less than 10 seconds to further deagglomerate the colloid. The colloid was then poured into a mold, and deaired. Gelation was accomplished by exposure of the colloid to a stream of $NH_3$ gas for 5 minutes. The gel was then allowed to dry and subsequently vacuum fired at 100° C. for 1 hour. In preparation for sintering, the sample was embedded in pure sulfur powder in a platinum wrapper. Sintering was carried out in a gas tight apparatus which allowed atmosphere control without escape of untreated toxic gases. The sample was brought up to a temperature of 920° C. over a period of 2.5 hours, in an atmosphere of pure $H_2S$. It was held at that temperature and atmosphere for 15 minutes. The furnace was then turned off, the atmosphere switched to $N_2$, and the sample allowed to cool at closed furnace rate to 600° C. At that point the furnace was opened, while maintaining the $N_2$ atmosphere, and allowed to cool down to room temperature.

The end product consisted of sphalerite, as indicated by x-ray diffraction studies. Densification was optimized under these sintering conditions, and the resultant microstructures were reproducible at hold temperatures between 890° C. and 920° C. The grain size obtained was 3-4 microns, with a very few pores 1 micron in diameter located at grain boundaries. There were no pores trapped within grains.

A similar green body was sintered in pure $H_2S$ in the absence of sulfur powder. This resulted in a mixture of sphalerite (dominant) and wurtzite in the end product. This mixture of phases greatly hindered the kinetics of sintering. As a result, densification was greatly reduced.

Further sintering runs were made in an atmosphere of forming gas ($H_2/N_2$), both at 900° C. and 1000° C. In this case the end products consisted of a mixture of wurtzite (dominant) and sphalerite. As in the previous case, densification was very poor.

In an attempt to further promote sulfur vacancies in a low sulfur fugacity atmosphere, samples were embedded in elemental zinc powder, placed on holders, and sintered under $H_2/N_2$. Because the boiling point of zinc is 907° C., the hold temperature during these runs was 1000° C. This ensured a significant partial pressure of zinc. The sintering products consisted predominantly of wurtzite with minor sphalerite present. Once again, atomic vacancies controlled the kinetics of sintering, accelerating densification. Grain size was approximately 10 microns, and the few remaining pores were subangular and located at triple junctions. There was no intragranular porosity.

Pure wurtzite as an end product was obtained by prefiring the sample at 600° C. in argon, and then subsequently sintering in $H_2/N_2$ and zinc vapor, at the conditions described above. Pure sphalerite, however, did not require any prefiring. This is in agreement with the observation that the activation energy for the production of wurtzite from sphalerite is considerably greater than that required for the reverse reaction. As a result, the conversion of wurtzite to sphalerite proceeds much faster than the reverse reaction.

When sintered, zinc sulfide is mint green and, under the binocular microscope, individual grains are translucent. However, because of scattering at pore sites, the samples are not transparent, but opaque, in the visible.

We claim:

1. A method of producing a non-stoichiometric, metal sulfide, monolithic body which comprises forming a colloidal dispersion of submicron particles of the metal sulfide, exposing the colloidal dispersion to a gelling agent to form a gel, drying the gel to a porous "green" body, and sintering the "green" body in an atmosphere that promotes atomic vacancies to increase atomic mobility in the body.

2. A method in accordance with claim 1 wherein the metal sulfide is zinc sulfide.

3. A method in accordance with claim 1 wherein the mean particle size of the submicron particles is 0.1 to 0.3 microns in diameter.

4. A method in accordance with claim 1 wherein the colloidal dispersion is formed by mixing the particles with a solution of a dispersant in a non-polar, organic medium.

5. A method in accordance with claim 4 wherein the medium is selected from the group consisting of chloroform, methylene chloride and acetone.

6. A method in accordance with claim 1 wherein the colloidal dispersion has a solids content of up to about 35% by weight.

7. A method in accordance with claim 1 wherein the colloidal dispersion is poured into a retainer having the shape of the ultimate monolithic body.

8. A method in accordance with claim 1 wherein the gelling agent employed is a basic material.

9. A method in accordance with claim 8 wherein the basic material is a source of ammonia vapors.

10. A method in accordance with claim 1 wherein the porous "green" body is sintered in a sulfidizing atmosphere, or in a reducing atmosphere.

11. A method in accordance with claim 10 wherein the sulfidizing atmosphere is hydrogen sulfide.

12. A method in accordance with claim 10 wherein the atmosphere is a sulfidizing atmosphere and the body is packed in sulfur.

13. A method in accordance with claim 10 wherein the atmosphere is a sulfidizing atmosphere and the body is sintered at a temperature in the range of 880° C. to 950° C.

14. A method in accordance with claim 10 wherein the atmosphere is a forming gas atmosphere and the body is packed in zinc metal powder.

15. A method in accordance with claim 14 wherein the body is sintered at a temperature in the range of 950° C. to 1000° C.

16. A method of producing a zinc sulfide, monolithic body which comprises forming a colloidal dispersion of submicron, zinc sulfide particles, exposing the colloidal dispersion to a gelling agent to form a gel, drying the gel to a porous, "green" body and sintering the body in an atmosphere that promotes atomic vacancies to increase atomic mobility in the body.

17. A method in accordance with claim 16 wherein the porous, "green" body is sintered in a sulfidizing atmosphere, or in a reducing atmosphere.

18. A method in accordance with claim 17 wherein the atmosphere is a sulfidizing atmosphere composed of hydrogen sulfide.

19. A method in accordance with claim 17 wherein the atmosphere is a sulfidizing atmosphere and the body is packed in sulfur powder.

20. A method in accordance with claim 17 wherein the atmosphere is forming gas and the body is packed in zinc powder.

* * * * *

UNITED STATES PATENT AND TRADEMARK OFFICE
CERTIFICATE OF CORRECTION

PATENT NO. : 5,108,674

DATED : April 28, 1992

INVENTOR(S) : Stebbins, et al.

It is certified that error appears in the above-identified patent and that said Letters Patent is hereby corrected as shown below:

On the title page, under item [19] should read --Echeverria et al--
Under item [75] should read --Lina M. Echeverria, Painted Post; Doris N. Stebbins, Corning, both of N.Y.--.

Signed and Sealed this

Twenty-ninth Day of June, 1993

Attest:

MICHAEL K. KIRK

Attesting Officer

Acting Commissioner of Patents and Trademarks